United States Patent
Passoni et al.

(10) Patent No.: US 6,346,798 B1
(45) Date of Patent: Feb. 12, 2002

(54) SINGLE WIRE CURRENT SHARING CONTROL TECHNIQUE FOR THE PARALLEL/REDUNDANT OPERATION OF A PLURALITY OF PWM CONVERTERS

(75) Inventors: Marco Passoni, Copiano; Paolo Nora, Belgioioso; Enrico Dallago, Pavia; Gabriele Sassone, Casale Monferrato, all of (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/589,902

(22) Filed: Jun. 7, 2000

(30) Foreign Application Priority Data

Jun. 7, 1999 (EP) .............................................. 99830354

(51) Int. Cl.⁷ ............................. H02M 7/00; G05F 1/40; G05F 1/44
(52) U.S. Cl. ....................... 323/272; 323/273; 323/282; 363/69; 363/72
(58) Field of Search ............................. 363/69, 71, 72; 323/271, 272, 273, 222, 282, 283, 284

(56) References Cited

U.S. PATENT DOCUMENTS

| | | | | |
|---|---|---|---|---|
| 4,194,147 A | | 3/1980 | Payne et al. ................... 323/17 |
| 4,609,828 A | * | 9/1986 | Small .......................... 307/44 |
| 4,635,178 A | * | 1/1987 | Greenhalgh ................... 363/65 |
| 4,717,833 A | * | 1/1988 | Small .......................... 307/44 |
| 4,734,844 A | * | 3/1988 | Rhoads ......................... 363/72 |
| 4,766,364 A | * | 8/1988 | Biamonte et al. ............ 323/272 |
| 5,164,890 A | * | 11/1992 | Nakagawa et al. ........... 363/65 |
| 5,428,523 A | * | 6/1995 | McDonnal .................... 363/71 |
| 5,521,809 A | * | 5/1996 | Ashley et al. ................. 363/71 |
| 5,691,627 A | * | 11/1997 | Shum ......................... 323/222 |
| 6,111,440 A | * | 8/2000 | Rajagopalan et al. ....... 327/137 |

FOREIGN PATENT DOCUMENTS

| | | | | |
|---|---|---|---|---|
| EP | 0388802 | | 9/1990 | ............. G05F/1/56 |
| GB | 2012501 A | * | 7/1979 | .......... H02M/3/335 |

* cited by examiner

Primary Examiner—Bao Q. Vu
(74) Attorney, Agent, or Firm—Theodore E. Galanthay; Allen, Dyer, Doppelt, Milbrath & Gilchrist, P.A.

(57) ABSTRACT

A modular power supply system includes DC—DC converters connected n parallel and functioning in a PWM mode. The modular power supply system controls current sharing among the DC—DC converters using a single wire current sharing control bus that drives in parallel the inputs of all the DC—DC converters. The output of each DC—DC converter is applied to a logic OR circuit. Each converter has an identical logic circuit between its output and the single wire current sharing control bus.

35 Claims, 3 Drawing Sheets

SINGLE WIRE CURRENT SHARING CONTROL TECHNIQUE FOR THE PARALLEL/REDUNDANT OPERATION OF A PLURALITY OF PWM CONVERTERS

FIELD OF THE INVENTION

The present invention relates to the field of electronics, and, more particularly, to a power supply system.

BACKGROUND OF THE INVENTION

A current sharing technique is often used to upgrade the current delivering capability of a power supply system by adding converter modules. This is done to avoid redesigning the power supply. The modules are in parallel so that the total current delivering capability is nominally the sum of the current capabilities of all the modules.

Parallel operation of the converter modules requires a special control, because, even small differences from the nominal output voltage value can cause considerable unbalancings among modules since their output impedance is intrinsically very small. When reliability of the power supply system is critically important, the special current sharing control is of great help, because, by having more modules operating in parallel than those strictly necessary, each module supplies less current than that nominally deliverable. This reduces electrical and thermal stress.

Moreover, if each module is properly designed, an advantageous redundancy can be introduced in a modular power supply system having such a current sharing control. Single or multiple failure tolerance can be easily achieved by adding one or more reserve modules. For these reasons, the current sharing technique is more often being used in computer power supply systems, especially for high reliability and high end productions.

Desktop and server processors require a stringent regulation of the supply voltage while absorbing currents often exceeding 10–15 A, with an extremely fast current slew rate. In these type conditions, a DC—DC switching converter is commonly required for regulating the supply voltage of the core of the processor. The DC—DC switching converter is often referred to as a voltage regulator module (VRM).

If more processors are present in the same system, as in server applications, it is necessary to have a power supply system of very high reliability capable of ensuring an augmented current delivering capability in case of need. Often, economy and convenience reasons impose implementation of a current sharing control using a single control wire, i.e., by a single control pin of each module.

A single wire current sharing control can be realized using an additional integrated controller dedicated to load sharing functions with respect to a normal DC—DC converter system. Commercially available examples are the devices UC3907 and UC3902, provided by Unitrode. This known approach implies resorting to rather complex techniques to secure stability of the according to this approach, it is necessary to sense the current flowing in the inductor.

In VRM applications, the use of a current sensing resistance is not favorably viewed because of the very high current levels associated to a relatively small output voltage. Any additional voltage drop in series to the output would negatively affect efficiency. Alternative sensing methods of the current flowing through the inductor can be employed, but such methods require additional circuitry.

The commercial device Si9143 provided by Temic Semiconductors, illustrated and described in a document titled "Current Sharing Controller for High Performance Processors" (Rev.B.03-NOV-97), uses a current sharing technique in which the necessary control is implemented with two wires, i.e., two dedicated pins.

Referring to FIG. 1, the current sharing is obtained by forcing every module to operate at the same duty-cycle. This is achieved by connecting in common the PWM pins and the SYNC pins of the two illustrated controllers. The SYNCH pins force each controller to start their own duty cycle at the same instant, while the PWM pins set the instant of the duty cycle of all controllers (modules). The current sharing mechanism is based upon matching the resistances of the converters operating in a parallel mode.

Considering the scheme illustrated in FIG. 2, exemplifying a so-called buck type synchronous power stage, in which the parasitic resistances of the power switch and of the output inductor are evidenced, the average of the large DC signal of two paralleled converters may be represented by the equivalent scheme of FIG. 3. Given that the input voltage Vin and the duty cycle D are the same for both converters, the current sharing control loop, as described in the application notes of the commercial devices.

Moreover, it is necessary to duplicate the integration of high performance analog circuitry, such as voltage references and error amplifiers in the main IC containing the power supply controller, as well as in the load sharing function controller IC. This approach is costly in terms of complexity and in integration area requirements.

The so-called droop techniques for implementing a current sharing control are based on a finite value of the converter output resistance. Therefore, it is necessary to sense the output current and the output resistance to secure a sufficiently precise control of the current sharing. This can cause a degradation of the output voltage regulation.

If the output current sensing resistance is relatively large, efficiency losses may become significant. In these cases, an additional amplifying circuit of the current sense signal may be necessary. Although the current sharing technique is relatively straightforward to implement in current mode controlled supplies, distinct current delivering modules should be synchronized among them.

This need reintroduces the necessity of using other dedicated pins. The output of the voltage error amplifier of the principal module or master module (converter) is also coupled with the slave PWM comparators.

Since the output of the voltage error amplifier determines the peak value of the current peak value in the inductor, the current of each module will follow the only driving signal coming from the master module. In this way, current sharing can be implemented with a high degree of precision. Unfortunately, voltage sources V1 and V2 have the same value, i.e., D*Vin. Thus, the total load current will flow in each branch depending upon their respective series resistances.

The technique realized in the Si9143 device is relatively easy and low-cost, but it does not satisfy the requirement of realizing a single wire current sharing control, i.e., of engaging only one pin of a converter module.

SUMMARY OF THE INVENTION

The present invention provides a current sharing control technique imolemented through a single wire, that is, by controlling through only one pin of the DC—DC converter modules operating in a PWM mode.

In absence of load transients, only one of the DC—DC converters functioning in parallel with the same duty cycle has a voltage loop active in regulating the output voltage, while the other converters have their voltage regulation loop saturated. This happens because of unavoidable differences among voltage references, and from error amplifier offset of the controllers of the distinct DC—DC converters. In addition, at low frequency the gain of the voltage regulation loop of the converters is extremely high by the presence off an integrating stage in the loop.

It is useless to synchronize the clocks of the controller different from the DC—DC converter modules having a saturated error amplifier. This is because, unavoidably, the duty cycle generated by their PWM modulator would be at a maximum, and would be useless for static regulation. What is strictly necessary to the parallel operation of converter modules is that the PWM signal come from the only converter that has its own voltage control loop being regulated.

According to the present invention, the controller of the DC—DC converter that has the voltage control loop being regulated and has been forcing the highest duty cycle for a sufficiently long time, is allowed to assume the role of master converter. The master thus furnishes its own PWM signal to all the other converters.

Since it is assumed that at least one of the converters has its own voltage loop in regulation, the so-called soft start function must act in a different manner than the usual, which results in a gradual increase of the duty cycle in an open loop condition. Preferably, the soft start function acts by limiting the voltage reference value at the noninverting input of the error amplifier instead of by forcing directly the error amplifier output, as usually done in a DC—DC converter.

DETAILED DESCRIPTION OF THE PREFERRED EMBODIMENTS

Figure 4:
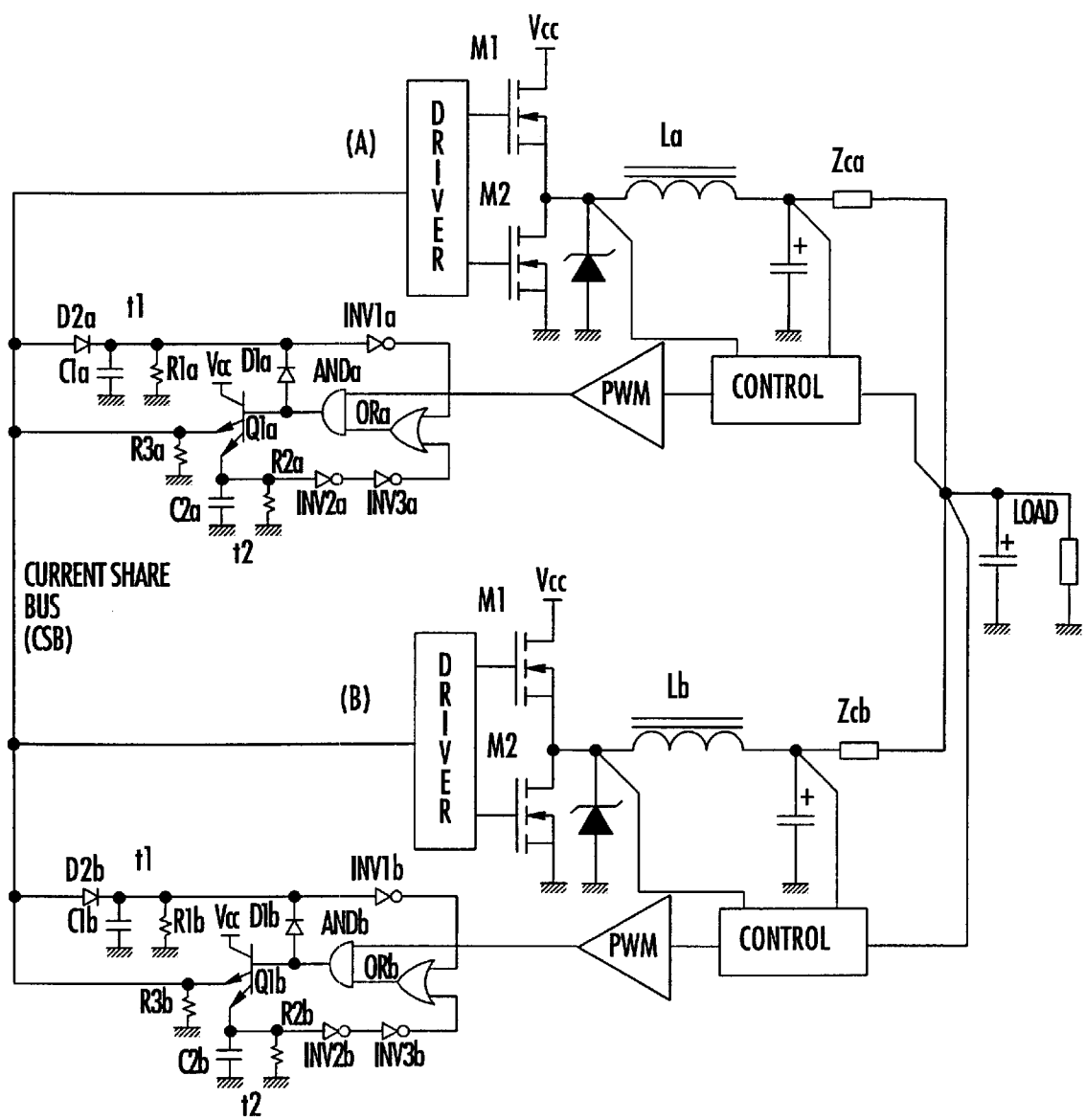
FIG. 4 is a circuit diagram of an embodiment of the present invention representing two distinct DC—DC converter modules connected so that they operate in parallel with each other.

Referring now to FIG. 4, a circuit diagram of a modular supply system according to the present invention is shown. Two distinct DC—DC converter modules are represented. They are connected so that they function in parallel by controlling the current sharing through a single wire, CURRENT SHARE BUS, or briefly CSB.

In the example, the two converter modules, which are indicated in their entirety by references (a) and (b), respectively, are of the buck type and are substantially identical to one another. Essentially, on the single wire control bus, CSB, a PWM signal is provided. The PWM signal is a hard-wired OR signal based upon the output signals of the respective PWM modulators of the two converter modules (a) and (b).

Figure 1:
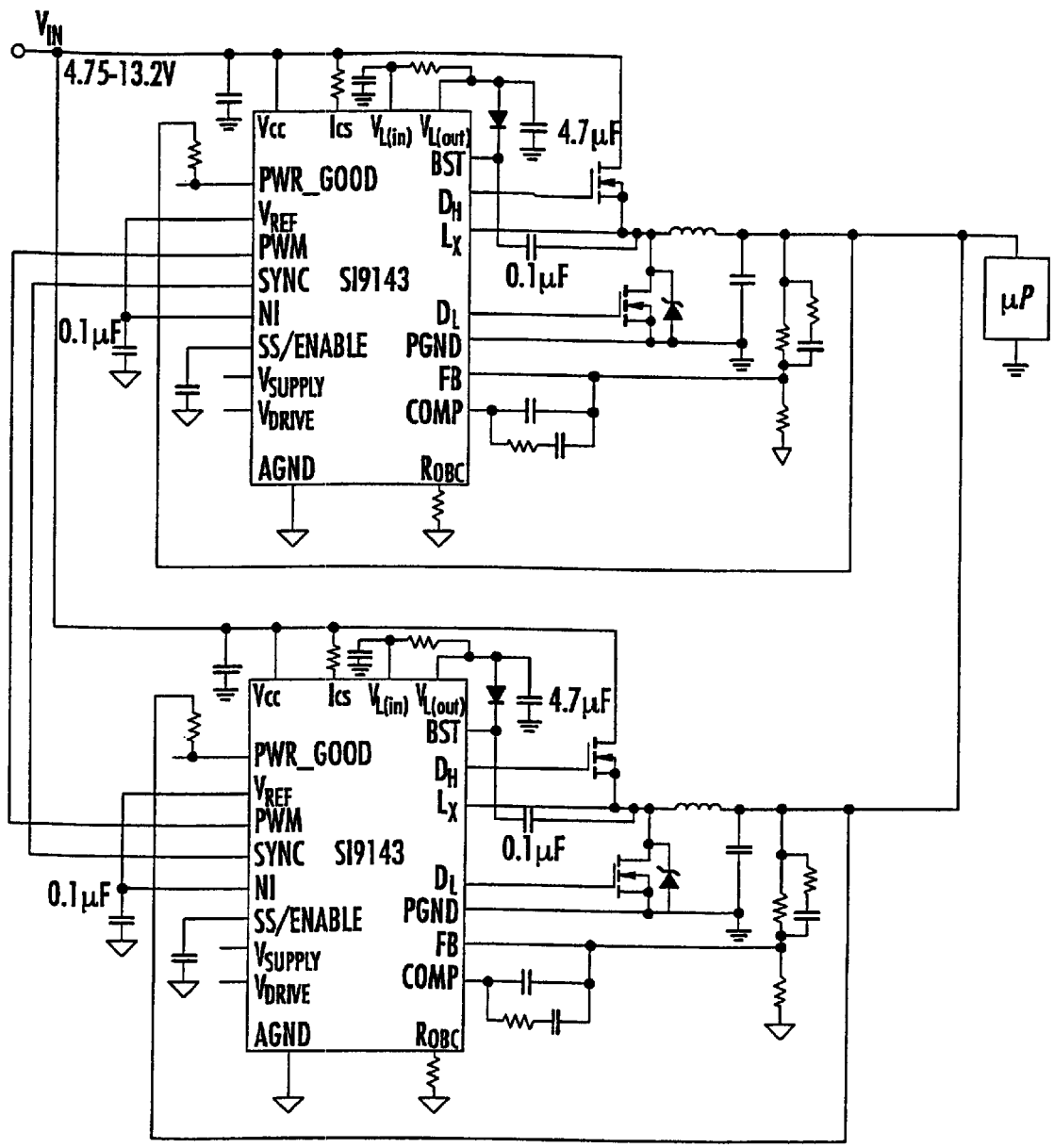
FIG. 1 is a circuit diagram of two distinct DC—DC convertor modules connected in parallel according to the prior art.
Figure 2:
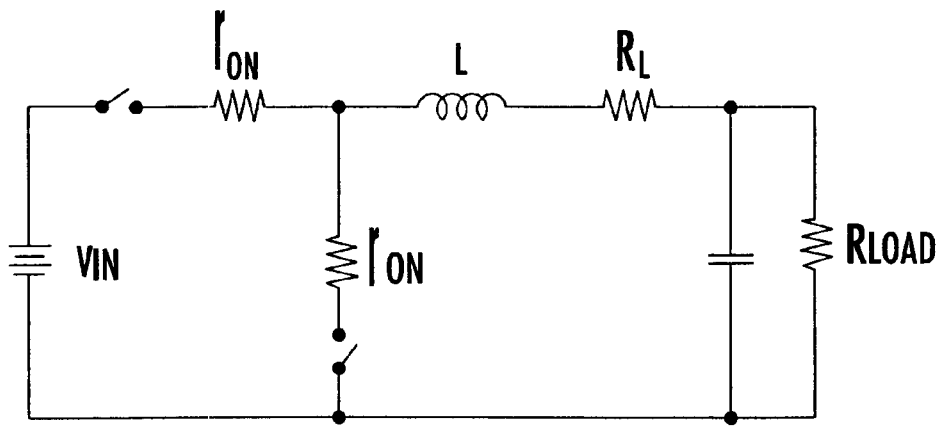
FIG. 2 is a diagram of a synchronous buck power stage according to the prior art, in which the parasitic resistances of the switches and inductors are shown.
Figure 3:
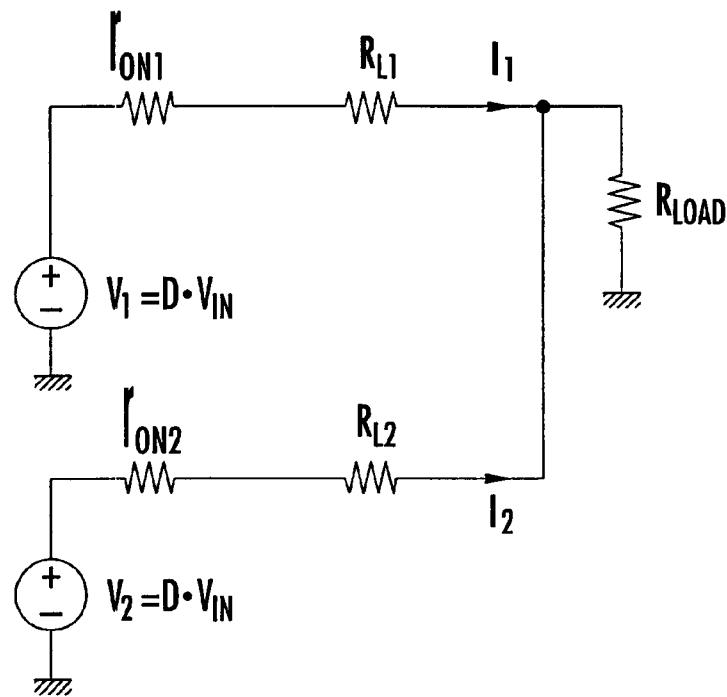
FIG. 3 is an equivalent diagram defining an average of a large DC signal of two converters operating in parallel, according to the prior art.

The interface stage of each converter may be realized, as in the example depicted in FIG. 3, with the following components: AND, OR, INV1, INV2, INV3, R1, R2, R3, C1, C2, D1, P2, Q1. In the figure, a suffix "a" or "b", depending upon which converter they belong to, is added to the identifiers of a particular component of the two identical interface stages.

The interface logic circuit can be implemented in different forms, provided that it performs the following functions. These functions include confirming, at every low-to-high switching of a PWM modulator, enablement for driving the single wire control bus CSB for the converter, which at that moment, is effectively setting the duty cycle. In other words, this converter is acting as a master converter.

These functions also include disabling the driving of the control bus CSB by any other converter functioning as a slave. The converters are also prevented from operating as a slave so that they do not unduly interfere with the driving of the CSB control bus, even in presence of a load transient. Enabling any converter, i.e., the PWM modulator of any converter, to drive the CSB control bus when the bus remains at a low logic level for a time interval greater than a certain limit. Such a condition is interpreted as a possible failure of the converter that has been operating as a master converter. In performing this last function, it is assumed that in case of a converter failure, the respective control circuit CONTROL is disconnected from the power supply.

Consideration of the steady-state condition without load transients will now be discussed. In accordance with what has been explained above, only one control circuit remains active. For illustration purposes, the controller (a) controls the drivers of the various paralleled supplies by the bus CURRENT SHARE BUS (CSB). It is assumed that a high logic state (H) of CSB corresponds to an on condition of the MOSFET M1.

At each L-to-H transition of the output of the gate ANDa, enablement to drive the CSB bus is confirmed by the monostable circuit comprised of C2a, R2a, INV2a and INV3a, and the gate OR_a. The monostable circuit may be indicated as the monostable circuit 2 for controller (a). The duration of the interval set by the monostable circuit 2 is indicated by t2.

The part of the circuit that includes D2, C1, R1 and INV1 implements another monostable circuit setting the interval t1. The monostable circuit may be indicated as monostable circuit 1. Monostable circuit 1 receives the CSB signal as an input and outputs a low level logic signal (L) until the CSB carries the normal driving signal, i.e., at the switching frequency and with a certain duty cycle. Therefore, one of the inputs of the OR gates remains at the level L until the CSB is switching.

If, in a start-up phase, the PWM modulator of controller (b) has commanded a zero duty cycle signal for a longer time than the interval set by monostable circuit 2, while the CSB was switching because of the driving of controller (a), both inputs of the gate OR_b are L and the output of the modulator PWM is masked. The ANDb output remains at level L, and the function of the hard-wired OR on CSB corresponds to the PWM signal coming from controller (a).

It will be shown in the following how this may happen. The only way to put back into operation the slave controllers that have been disabled to drive the CSB, is that the bus remains in a logic low state for a longer time than the duration of the interval set by the monostable circuit 1. If the CSB remains at logic state longer than normal at level L, the monostable circuit output switches to level H after a delay time proportional to the time constant R1C1 from the Last transition from level H to level L of the CSB.

The time constant R1C1 must be chosen such that the disabled controllers will not be enabled by a foreseeable transition from a high Load current to a low load current, during which the CSB may remain at level L for times longer than the switching period. A similar function is performed by the monostable circuit 2 made of C2, R2, Q1, INV2 and INV3, which receives as input the output of the AND gate and outputs a level H while its input is switching.

If its input remains at level L, the output of the monostable circuit switches to level L after a delay time proportional to the time constant R2C2 from the last input transition from level H to level L. The outputs of the monostable circuits are summed by the OR gate obtaining a logical signal denoted with E (Enable). When E is high, the AND gate transfers the output of the modulator to the base of Q1, which together with the pull-down resistance R3 form a hard-wired OR function. Therefore, if the different signals E are high, the logical sum of the drive signals of the modulators is present on the CSB bus.

In order to study the circuit reaching a steady-state operating condition, it is assumed that the start-up uses a soft start function acting on the voltage reference by increasing it gradually from zero to the nominal value. Initially, the CSB does not switch, so all the enabling signals F are high and the logical sum of the modulators output is present on the CSB. These signals are asynchronous among each other, and a synchronizing clock signal is not present.

Therefore, on the CSB is present a logical signal of variable frequency, characterized by a duty cycle greater than the duty cycle set up by each module. For this reason, the output voltage exceeds the reference voltage which is slowly increasing, causing a negative saturation of the control loop.

In particular, between the two controllers the first controller reaching saturation is that which, because of existing offsets, would impose the lowest output voltage. At this point, on the CSB is present only the output of the modulator whose regulator is still functioning in a closed loop mode.

If there are not rapid variations of the output voltage caused by load transients during the soft start phase, the saturated regulator remains in such a state and this condition, after a certain time, causes the switching of the monostable circuit 2 of the regulator from the H level to the L level. Because the CSB is switching, the output of the monostable circuit 1 of the saturated module is low, and the signal E of the same module assumes the L logical state. This isolates the output of the modulator from the CSB bus.

In these conditions, only a regulator is active in driving both modules. The saturated regulator, upon a load transient, could exit from its state of negative saturation because of the drop of the output voltage of the power supply system. Nevertheless, because the Enable signal E is low, the output of the (a) modulator is not transferred on the CSB. Therefore, even during a toad transient, the active regulator is only one. In the event of a failure of the module whose regulator is active, it is supposed that the CSB bus is permanently set at level If this occurs, after a certain time the monostable circuit 1 of the remaining module will restore again the Enable signal E, and the controller will drive the intact VRM. The monostable circuit 1 must intervene after a period of time longer than the persistence of a negative saturation state of the regulator at load turn-off. This may be estimated, in a first approximation, as the discharge time of the inductance L at a constant voltage equal to the output voltage Vload, starting from the load current.

That which is claimed is:

1. A power supply system comprising:
    a plurality of DC—DC converters connected in parallel and functioning in a pulse width modulation (PWM) mode, each DC—DC converter comprising a PWM modulator;
    a current sharing bus (CSB) connected to parallel inputs of said plurality of DC—DC converters; and
    a respective logic circuit for each DC—DC converter for interfacing between said CSB and an output of a respective PWM modulator for controlling current sharing among said DC—DC converters, each logic circuit comprising
        a first monostable circuit defining a first time interval, and having an input coupled to said CSB, and an output for providing a low level logic signal as long as a driving signal with a predetermined switching frequency is present on said CSB,
        a driving stage for driving said CSB, and
        a second monostable circuit defining a second time interval, and having an input coupled to said driving stage.

2. A power supply system according to claim 1, wherein each logic circuit is identical to one another.

3. A power supply system according to claim 1, wherein each logic circuit confirms at each low-to-high level switching of the PWM modulator connected thereto enablement of the DC—DC converter associated therewith for driving said CSB if the DC—DC converter is setting a duty-cycle of the power supply system or acting as a master converter.

4. A power supply system according to claim 1, wherein each logic circuit comprises a driving stage for driving said CSB; and wherein each logic circuit disables said driving stage when said DC—DC converter associated therewith is functioning as a slave converter.

5. A power supply system according to claim 1, wherein each logic circuit prevents said DC—DC converter associated therewith from interfering with driving of said CSB when operating as a slave converter.

6. A power supply system according to claim 1, wherein each logic circuit enables said respective PWM modulator for driving said CSB if a driving signal thereon remains at a low logic level for greater than a predetermined time.

7. A power supply system according to claim 1, wherein each logic circuit further comprises:
    a logic OR gate;
    a logic AND gate having a first input connected to an output of said logic OR gate, and a second input connected to the output of said PWM modulator;
    an output of said first monostable circuit and an output of said second monostable circuit being connected to inputs of said logic OR gate; and
    an input of said driving stage being connected to an output of said logic AND gate.

8. A power supply system according to claim 1, wherein said CSB comprises a single wire CSB.

9. A power supply system comprising:
    a plurality of DC—DC converters connected in parallel, each DC—DC converter comprising a modulator;
    a current sharing bus (CSB) connected to parallel inputs of said plurality of DC—DC converters; and
    a respective logic circuit for each DC—DC converter for interfacing between said CSB and an output of a respective modulator for controlling current sharing among said DC—DC converters;

one of said logic circuits enabling said DC—DC converter associated therewith for driving said CSB if said DC—DC converter is acting as a master converter by setting a duty cycle of the power supply system, and other of said logic circuits respectively disabling said DC—DC converters associated therewith when operating as a slave converter.

10. A power supply system according to claim 9, wherein each DC—DC converter functions in a pulse width modulation (PWM) mode.

11. A power supply system according to claim 9, wherein said modulator comprises a pulse width modulation (PWM) modulator.

12. A power supply system according to claim 9, wherein each logic circuit is identical to one another.

13. A power supply system according to claim 9, wherein enablement of each DC—DC converter is based upon confirmation at each low-to-high level switching of a respective modulator connected thereto.

14. A power supply system according to claim 9, wherein each logic circuit comprises a driving stage for driving said CSB; and wherein each logic circuit disables said driving stage when said DC—DC converter associated therewith is functioning as a slave converter.

15. A power supply system according to claim 9, wherein each logic circuit enables said respective modulator for driving said CSB if a driving signal thereon remains at a low logic level for greater than a predetermined time.

16. A power supply system according to claim 9, wherein each logic circuit comprises:
 a first monostable circuit defining a first time interval, and having an input coupled to said CSB, and an output for providing a low level logic signal as long as a driving signal with a predetermined switching frequency is present on said CSB;
 a driving stage for driving said CSB; and
 a second monostable circuit defining a second time interval, and having an input coupled to said driving stage.

17. A power supply system according to claim 16, wherein each logic circuit further comprises:
 a logic OR gate;
 a logic AND gate having a first input connected to an output of said logic OR gate, and a second input connected to the output of said modulator;
 an output of said first monostable circuit and an output of said second monostable circuit being connected to inputs of said logic OR gate; and
 an input of said driving stage being connected to an output of said logic AND gate.

18. A power supply system according to claim 9, wherein said CSB comprises a single wire CSB.

19. A method for controlling output current for a power supply system comprising a plurality of DC—DC converters connected in parallel and functioning in a pulse width modulation (PWM) mode, each DC—DC converter comprising a PWM modulator, the method comprising:
 connecting a current sharing bus (CSB) to parallel inputs of the plurality of DC—DC converters; and
 operating a respective logic circuit that interfaces between the CSB and an output of a respective PWM modulator for controlling current sharing among the DC—DC converters by
  defining a first time interval for a first monostable circuit having an input coupled to the CSB, and an output for providing a low level logic signal as long as a driving signal with a predetermined switching frequency is present on the CSB,
  driving the CSB using a driving stage, and
  defining a second time interval for a second monostable circuit having an input coupled to the driving stage.

20. A method according to claim 19, wherein each logic circuit is identical to one another.

21. A method according to claim 19, further comprising confirming at each low-to-high level switching of the PWM modulator connected to each logic circuit for enabling the DC—DC converter associated therewith for driving the CSB if the DC—DC converter is setting a duty-cycle of the power supply system or acting as a master converter.

22. A method according to claim 19, wherein each logic circuit comprises a driving stage for driving the CSB; the method further comprising disabling the driving stage when the DC—DC converter associated therewith is functioning as a slave converter.

23. A method according to claim 19, further comprising preventing a DC—DC converter from interfering with driving of the CSB when operating as a slave converter.

24. A method according to claim 19, further comprising enabling the PWM modulator for driving the CSB if a driving signal thereon remains at a low logic level for greater than a predetermined time.

25. A method according to claim 19, wherein each logic circuit further comprises a logic OR gate, and a logic AND gate having a first input connected to an output of the logic OR gate, and a second input connected to the output of said PWM modulator, the method further comprising:
 connecting an output of the first monostable circuit and connecting an output of the second monostable circuit to inputs of the logic OR gate; and
 connecting an input of the driving stage to an output of the logic AND gate.

26. A method according to claim 19, wherein connecting the CSB comprises connecting a single wire CSB.

27. A power supply system comprising:
 a plurality of DC—DC converters connected in parallel, each DC—DC converter comprising a modulator;
 a single wire current sharing bus (CSB) connected to parallel inputs of said plurality of DC—DC converters; and
 a respective logic circuit for each DC—DC converter for interfacing between said CSB and an output of a respective modulator for controlling current sharing among said DC—DC converters;
 one of said logic circuits enabling said DC—DC converter associated therewith for driving said CSB if said DC—DC converter is setting a duty-cycle of the power supply system or acting as a master converter, and other of said logic circuits respectively disabling said DC—DC converters associated therewith when operating as a slave converter.

28. A power supply system according to claim 27, wherein each DC—DC converter functions in a pulse width modulation (PWM) mode.

29. A power supply system according to claim 27, wherein said modulator comprises a pulse width modulation (PWM) modulator.

30. A power supply system according to claim 27, wherein each logic circuit is identical to one another.

31. A power supply system according to claim 27, wherein enablement of each DC—DC converter is based upon confirmation at each low-to-high level switching of a respective modulator connected thereto.

32. A power supply system according to claim 27, wherein each logic circuit comprises a driving stage for driving said CSB; and wherein each logic circuit disables said driving stage when said DC—DC converter associated therewith is functioning as a slave converter.

33. A power supply system according to claim 27, wherein each logic circuit enables said respective modulator for driving said CSB if a driving signal thereon remains at a low logic level for greater than a predetermined time.

34. A power supply system according to claim 27, wherein each logic circuit comprises:
- a first monostable circuit defining a first time interval, and having an input coupled to said CSB, and an output for providing a low level logic signal as long as a driving signal with a predetermined switching frequency is present on said CSB;
- a driving stage for driving said CSB; and
- a second monostable circuit defining a second time interval, and having an input coupled to said driving stage.

35. A power supply system according to claim 34, wherein each logic circuit further comprises:
- a logic OR gate;
- a logic AND gate having a first input connected to an output of said logic OR gate, and a second input connected to the output of said modulator;
- an output of said first monostable circuit and an output of said second monostable circuit being connected to inputs of said logic OR gate; and
- an input of said driving stage being connected to an output of said logic AND gate.

* * * * *

UNITED STATES PATENT AND TRADEMARK OFFICE
CERTIFICATE OF CORRECTION

PATENT NO.    : 6,346,798 B1
DATED         : February 12, 2002
INVENTOR(S)   : Marco Passoni, Paolo Nora, Enrico Dallago and Gabriele Sassone It is certified that error appears in the above-identified patent and that said Letters Patent is hereby corrected as shown below:

Column 1,
Line 56, between "of the" and "according" insert:

-- current sharing control loop, as described in the application notes of the commercial devices.
   Moreover, it is necessary to duplicate the integration of high performance analog circuitry, such as voltage references and error amplifiers in the main IC containing the power supply controller, as well as in the load sharing function controller IC. This approach is costly in terms of complexity and in integration area requirements.
   The so-called droop techniques for implementing a current sharing control are based on a finite value of the converter output resistance. Therefore, it is necessary to sense the output current and the output resistance to secure a sufficiently precise control of the current sharing. This can cause a degradation of the output voltage regulation.
   If the output current sensing resistance is relatively large, efficiency losses may become significant. In these cases, an additional amplifying circuit of the current sense signal may be necessary. Although the current sharing technique is relatively straightforward to implement in current mode controlled supplies, distinct current delivering modules should be synchronized among them.
   This need reintroduces the necessity of using other dedicated pins. The output of the voltage error amplifier of the principal module or master module (converter) is also coupled with the slave PWM comparators.
   Since the output of the voltage error amplifier determines the peak value of the current peak value in the inductor, the current of each module will follow the only driving signal coming from the master module. In this way, current sharing can be implemented with a high degree of precision. Unfortunately, --

UNITED STATES PATENT AND TRADEMARK OFFICE
CERTIFICATE OF CORRECTION

PATENT NO. : 6,346,798 B1
DATED : February 12, 2002
INVENTOR(S) : Marco Passoni, Paolo Nora, Enrico Dallago and Gabriele Sassone It is certified that error appears in the above-identified patent and that said Letters Patent is hereby corrected as shown below:

Column 2,
Lines 21-52, strike:
" current sharing control loop, as described in the application notes of the commercial devices.
Moreover, it is necessary to duplicate the integration of high performance analog circuitry, such as voltage references and error amplifiers in the main IC containing the power supply controller, as well as in the load sharing function controller IC. This approach is costly in terms of complexity and in integration area requirements.
The so-called droop techniques for implementing a current sharing control are based on a finite value of the converter output resistance. Therefore, it is necessary to sense the output current and the output resistance to secure a sufficiently precise control of the current sharing. This can cause a degradation of the output voltage regulation.
If the output current sensing resistance is relatively large, efficiency losses may become significant. In these cases, an additional amplifying circuit of the current sense signal may be necessary. Although the current sharing technique is relatively straightforward to implement in current mode controlled supplies, distinct current delivering modules should be synchronized among them.
This need reintroduces the necessity of using other dedicated pins. The output of the voltage error amplifier of the principal module or master module (converter) is also coupled with the slave PWM comparators.
Since the output of the voltage error amplifier determines the peak value of the current peak value in the inductor, the current of each module will follow the only driving signal coming from the master module. In this way, current sharing can be implemented with a high degree of precision. Unfortunately, "

Line 61, strike "imolemented" insert -- implemented --

Column 3,
Line 7, strike "off" insert -- of --

UNITED STATES PATENT AND TRADEMARK OFFICE
CERTIFICATE OF CORRECTION

PATENT NO.   : 6,346,798 B1
DATED        : February 12, 2002
INVENTOR(S)  : Marco Passoni, Paolo Nora, Enrico Dallago and Gabriele Sassone It is certified that error appears in the above-identified patent and that said Letters Patent is hereby corrected as shown below:

<u>Column 4,</u>
Line 2, strike "P2" insert -- D2 --
Line 65, strike "Last" insert -- last --

<u>Column 5,</u>
Line 3, strike "Load" insert -- load --
Line 24, strike "F" insert -- E --
Line 57, strike "level" insert -- level L. --

Signed and Sealed this

Twelfth Day of November, 2002

*Attest:*

*Attesting Officer*

JAMES E. ROGAN
*Director of the United States Patent and Trademark Office*